Patented Dec. 14, 1948

2,456,121

UNITED STATES PATENT OFFICE 2,456,121

FLUX COATING FOR WELDING RODS

Walter Goerg, North Bergen, N. J., assignor to Air Reduction Company, Incorporated, New York, N. Y., a corporation of New York No Drawing. Application April 17, 1946, Serial No. 662,923

1 Claim. (Cl. 219—8)

This invention relates to coated welding rods and particularly to an improved flux coating which can be applied easily and economically, adheres satisfactorily to the welding rod and forms an effective flux coating on the molten metal of the weld.

Bronze and other metal welding rods are coated with a flux composition which is melted with the metal to form a protective blanket for the weld. The coating is applied customarily by dipping the rod in an aqueous solution of the flux. Much difficulty has been experienced in obtaining satisfactory adhesion of the flux to the rod. Hence it has been customary to dip the coated rods a second time in a mixture of collodion and acetone which acts as a binder. The second dipping operation necessarily involves additional expense. Furthermore, the mixture of collodion and acetone involves hazards which are preferably to be avoided.

It is the object of the present invention to provide a novel flux composition which includes a binder and permits application of a satisfactory coating to welding rods in a single dipping operation.

Another object of the invention is the provision of a flux composition which, when melted with the rod, affords a satisfactory protective layer over the weld.

Other objects and advantages of the invention will be apparent as it is better understood by reference to the following specification in which the preferred embodiments of the invention are described.

I have discovered that the addition of a relatively small amount of sodium alginate, a sodium salt of alginic acid obtained by the extraction of certain seaweeds, to a mixture of water soluble flux ingredients, affords in water solution a more or less viscous liquid coating composition which adheres readily to bronze and other metal welding rods. The welding rods are coated with this composition by dipping. The coating is permitted to dry and forms a firm adhering covering for the rods which melts, when the rod is used, to produce a liquid flux covering the molten metal of the weld.

Various ingredients may be employed in the flux composition. The preferred composition includes the following, expressed both in the dry form and with the added water:

| Dry formula | Percent | Limits Percent |
|---|---|---|
| Boric Acid | 71.90 | 67.40 to 76.40 |
| Borax | 13.50 | 9.00 to 15.70 |
| Sodium Silicate | 11.20 | 11.20 to 15.70 |
| Potassium Bichromate | 2.30 | 1.10 to 3.40 |
| Sodium Alginate | 1.10 | .90 to 1.10 |
|  | 100.00 |  |

| Wet formula | Percent | Limits Percent |
|---|---|---|
| Water | 55.50 | 50.00 to 60.00 |
| Boric Acid | 32.00 | 30.00 to 34.00 |
| Borax | 6.00 | 4.00 to 7.00 |
| Sodium Silicate | 5.00 | 5.00 to 7.00 |
| Potassium Bichromate | 1.00 | .50 to 1.50 |
| Sodium Alginate | .50 | .40 to .50 |
|  | 100.00 |  |

Sodium bichromate may be substituted for potassium bichromate in the composition. The limits as expressed are illustrative only. The proportions are not critical, and wider ranges of proportions may be used effectively.

While the specified ingredients are most suitable, particularly as a coating composition for bronze welding rods, some of them may be eliminated, or substitutions may be made therefor. The proportions may be modified as indicated, and other changes may be made in the composition, so long as it includes the water-soluble materials which act as fluxing agents when melted.

The invention, as hereinbefore indicated, depends upon the addition of relatively small proportions of sodium alginate which, when the composition is dissolved in water, affords a coating composition which can be applied to the rods by dipping. The sodium alginate causes the composition to adhere to the welding rods both during the dipping operation and after drying. A second dipping operation is, therefore, unnecessary.

The dry composition as described may be dissolved in any suitable proportion of water. Usually about 50% by weight of water is sufficient.

However, the amount can be adjusted readily to afford a dipping solution of suitable viscosity. The amount of coating deposited on the rods can be varied readily by modifying the viscosity of the solution.

Various changes may be made in the details of the invention as described without departing therefrom or sacrificing the advantages thereof.

I claim:

A welding rod consisting of a metal and a coating adhering to the surface thereof, consisting of boric acid 67.40 to 76.40%, borax 9.00 to 15.70%, sodium silicate 11.20 to 15.70%, alkali metal bichromate 1.10 to 3.40% and sodium alginate 0.90 to 1.10%.

WALTER GOERG.

REFERENCES CITED

The following references are of record in the file of this patent:

UNITED STATES PATENTS

| Number | Name | Date |
|---|---|---|
| 1,663,004 | Green | Mar. 20, 1928 |
| 1,783,013 | Green | Nov. 28, 1930 |
| 1,872,320 | Mino et al. | Aug. 16, 1932 |
| 1,946,958 | Anastasiadis | Feb. 13, 1934 |
| 2,052,400 | Mositz | Aug. 25, 1936 |
| 2,199,440 | Lyttle et al. | May 7, 1940 |
| 2,209,829 | Rasmussen et al. | July 30, 1940 |
| 2,274,637 | Rooke et al. | Mar. 3, 1942 |

FOREIGN PATENTS

| Number | Country | Date |
|---|---|---|
| 363,815 | Great Britain | Dec. 31, 1931 |

OTHER REFERENCES

The Condensed Chemical Dictionary, Third Edition (1942), pages 56, 388 and 389, Reinhold Publishing Co., New York. (Copy in Division 3.)